United States Patent [19]

Brainard

[11] 4,365,282

[45] Dec. 21, 1982

[54] OVERVOLTAGE PROTECTOR USING VARISTOR INITIATED ARC

[75] Inventor: John P. Brainard, Albuquerque, N. Mex.

[73] Assignee: The United States of America as represented by the United States Department of Energy, Washington, D.C.

[21] Appl. No.: 121,566

[22] Filed: Feb. 14, 1980

[51] Int. Cl.³ .............................................. H02H 9/04

[52] U.S. Cl. ................................... 361/127; 361/128; 361/119; 361/120; 361/56; 338/21

[58] Field of Search ............... 361/127, 128, 117, 118, 361/126, 129, 56, 91, 119; 333/12, 182, 206; 339/14 R, 14 P, 143 R, 177 R; 338/20, 21

[56] References Cited

U.S. PATENT DOCUMENTS

| | | | |
|---|---|---|---|
| 1,763,667 | 6/1930 | McFarlin | 338/21 X |
| 1,935,810 | 11/1933 | McFarlin | 361/127 X |
| 2,072,850 | 3/1937 | Andre | 338/21 |
| 2,276,732 | 3/1942 | Ludwig et al. | 338/21 |
| 2,309,183 | 1/1943 | Gilson et al. | 361/127 X |
| 3,693,053 | 9/1972 | Anderson | 361/56 |
| 3,702,420 | 11/1972 | Cooper | 361/120 |
| 3,711,794 | 1/1973 | Tasca et al. | 338/21 X |
| 3,725,745 | 4/1973 | Zisa | 338/21 X |
| 3,742,420 | 6/1973 | Harnden, Jr. | 338/21 |
| 3,766,510 | 10/1973 | Quinn | 338/20 |
| 3,821,686 | 6/1974 | Harnden, Jr. | 338/21 |
| 3,992,652 | 11/1976 | Blaisdell et al. | 361/120 X |
| 4,237,515 | 12/1980 | Pierce, Jr. | 361/127 |

FOREIGN PATENT DOCUMENTS

| | | | |
|---|---|---|---|
| 1070733 | 12/1959 | Fed. Rep. of Germany | 361/120 |
| 550103 | 12/1942 | United Kingdom | 361/126 |
| 553461 | 5/1943 | United Kingdom | 361/126 |

*Primary Examiner*—Patrick R. Salce

[57] ABSTRACT

Coaxial conductors are protected against electrical overvoltage by at least one element of non-electroded varistor material that adjoins each other varistor element and conductor with which it contacts. With this construction, overvoltage current initiated through the varistor material arcs at the point contacts between varistor elements and, as the current increases, the arcs increase until they become a continuous arc between conductors, bypassing the varistor material.

11 Claims, 9 Drawing Figures

OVERVOLTAGE PROTECTOR USING VARISTOR INITIATED ARC

The United States Government has rights in this invention pursuant to Contract No. DE-AC04-76DP00789 between the Department of Energy and Sandia Corporation.

BACKGROUND OF THE INVENTION

The present invention relates generally to overvoltage protectors and more particularly to a device using a varistor initiated arc as an overvoltage protector.

Electronic circuits under field environments are often subjected to undesired transient high voltage signals known as overvoltages. For example, equipment which is either subject to lightning strikes or is connected to antennas subject to lightning strikes must be protected against overvoltages that can cause component burnout, malfunction or premature activation. To achieve this protection, many devices using a varistor material to discharge the overvoltage have been developed.

U.S. Pat. No. 2,072,850 of G. E. Andre discloses a device to protect radio antennas from lightning using at least two conductors having a gap therebetween filled with a compacted, granular material such as silicon carbide. According to the disclosure, the spacing of the conductors and the compression of the material are the factors which control the magnitude of the overvoltage that will be conducted.

Other devices have been constructed in the form of electrical connectors which permit electrical signals to be communicated along cables in a conventional manner, but which discharge overvoltages to ground.

U.S. Pat. No. 3,702,420 of J. A. Cooper discloses an electrical connector having a plurality of conducting pins insulated from ground by a thin sleeve of high dielectric constant material that terminates at an air chamber within the connector. An overvoltage on the pin is stimulated by the dielectric material to arc to ground in the air chamber at the end of the sleeve.

U.S. Pat. No. 3,711,794 to D. Tasca et al. discloses a coaxial connector which utilized a toroidal shaped member of varistor material comprising fine particles of zinc oxide and additives that have been pressed and sintered at high temperatures to provide a composite body of metallized material. As the voltage across the material increases, its impedance decreases, effectively limiting the overvoltage on the center conductor of the connector.

U.S. Pat. No. 3,725,745 of W. J. Zisa discloses an overvoltage protector for an electrical watt-meter including a compacted mass of granulated silicon carbide in series with an air spark gap. This invention uses the silicon carbide to limit the current which flows when an overvoltage causes a spark to jump the gap, thus minimizing electrode splattering caused by high current sparks.

These and other similar previous devices all have certain disadvantages which minimize their effectiveness when protecting certain electronic equipments from overvoltages caused by lightning strikes. Many spark gap devices do not break down at a low enough voltage to protect sensitive semiconductor components. Those designed to break down at lower voltages, such as are shown in the Cooper patent, are not predictable enough in their performance; i.e., variations in breakdown voltage caused by manufacturing tolerances or changes in humidity keep them from being as reliable as desired for many applications. Similarly, devices which depend on conduction of a varistor material, such as shown in the other patents noted above, may work satisfactorily at low voltages but be destroyed by the high current of a lightning strike.

SUMMARY OF THE INVENTION

It is an object of this invention to provide an overvoltage protection device which reliably protects against all voltages which exceed the limitations of the device.

It is another object of this invention to provide an overvoltage protection device which has a much greater resistance to failure than previous devices upon the application of a lightning strike.

It is a further object of this invention to provide an overvoltage protection device which is simple to construct.

It is still another object of this invention to provide an overvoltage protection device which initiates conduction through controllable varistor material and completes breakdown across a low impedance spark gap.

Additional objects, advantages and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects in accordance with the purpose of the present invention, as embodied and broadly described herein, the overvoltage protection device may comprise an insulated enclosure containing a pair of opposed electrical conductors spaced apart a minimum distance X, one or more elements of non-electroded varistor material having a minimum cross-sectional dimension greater than 0.2X forming a relatively high impedance current path between the conductors, with each element of varistor material in essentially point or line contact with each other element or conductor with which it is in contact, and a gas providing a relatively low impedance current path between the conductors. With this construction, an overvoltage on one conductor is initiated by the varistor material to arc across the gap between the conductors. In a preferred embodiment of the invention, a plurality of pins of an electrical connector are protected by a conductor comprising a metal plate with a hole for each pin placed over the pins, insulator sheets placed above and below the plate with varistor elements as described above placed between the pins and the plate. In a second preferred embodiment, the varistor material is shaped as a sleeve having an inside diameter greater than the diameter of the pin, a thickness equal to the minimum spacing between the conductors, and an outer diameter less than the diameter of the hole in the plate.

DETAILED DESCRIPTION OF THE INVENTION

Figure 1:
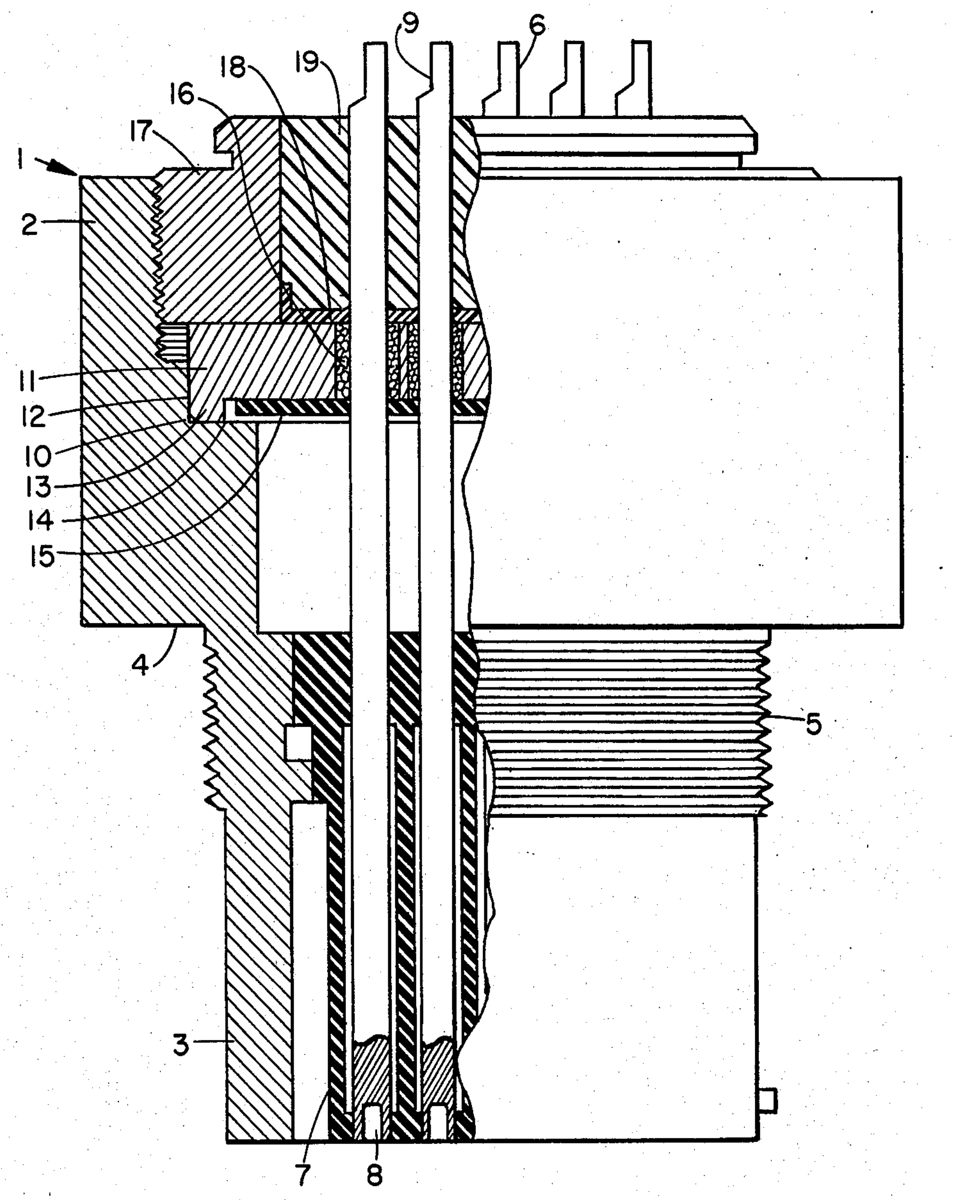
FIG. 1 is a partial cutaway plan view of a multi-pin coaxial connector that includes a preferred varistor initiated overvoltage protection device of the invention.

FIG. 1 shows a lightning arrestor connector 1 having an stainless steel hollow cylindrical case 2 designed to be affixed to the electrical ground of an electrical system to be protected against overvoltage. Case 2 has portion 3 having a reduced diameter for insertion through a hole in the frame (not shown) of the system to be protected against overvoltage. Shoulder 4 formed by the reduced diameter provides one surface and a nut (not shown) fastened to threads 5 in the reduced diameter provides a second surface for retaining connector 1.

Connector 1 contains eighteen pins 6, five of which are shown, electrically insulated from each other and case 2 by insulating pin retainer 7 fitted in reduced portion 3 by techniques well known in the connector art. As illustrated, each pin 6 has female portion 8 to accept the pins of a male plug (not shown) which connects to the reduced portion of connector 1 in a conventional manner. At their other end, each of pin 6 has opening 9 wherein a wire may be welded or soldered.

The interior of case 1 has a portion 10 having a stepped, reduced interior diameter which serves to position and retain ground conductor 11, the means for dissipating an electrical overvoltage. Conductor 11 is a circular plate having a hole for the passage of each pin 6 and an outer diameter equal to the inner diameter of face 12 of portion 10. The outer diameter of conductor 11 has an elongated portion 13 which rests against face 14 of stepped portion 10. Insulating plate 15, having a hole for each pin 6, is affixed by glue or any other technique to the underside of conductor 11. Each of the holes in conductor 11 has a slightly greater diameter than its associated pin 6. In accordance with the invention the space between the pin and the side of the hole is filled with a gas and a varistor material 16 as hereinafter described. Retainer nut 17 is screwed into case 2 to hold conductor 11 against face 14. Insulating web 18, having a hole for each pin 6, is pressed against the top of conductor 11 to retain varistor material 16. The remaining space within case 2 above plate 17 is sealed with potting material 19.

When an electrical signal along any of pins 6 is subjected to an overvoltage, varistor material 16 initiates an arc in the gas between the pin 6 and conductor 11 to protect the circuit connected to the pin 6. The operation of this invention is best understood by reference to FIG. 2 which shows a detailed view of the embodiment of the invention included in the typical connector 1 of FIG. 1.

Electrical conductor 6, illustrated as a pin but which may be any electrical conductor carrying an electrical signal, is spaced a minimum distance X from second conductor 11, illustrated as the inner surface of a metal annular formed as the surface of a hole in a plate. The volume between the conductor and insulating plates 15 and 18 is loosely filled with an arc-sustaining gas and a plurality of elements of non-electroded varistor material 16, with each element having a minimum cross-sectional dimension of about 0.2X, a desired cross-sectional dimension of about 0.5X and a maximum cross-sectional dimension of about 0.8X. (A non-electroded material is one to which a metal electrode has not been attached by techniques such as bonding, metallization, vapor deposition, spraying, etc.).

In a preferred embodiment, about 50% of the volume is filled with air at atmospheric pressure and the remainder with varistor elements prepared by pressing ZnO, CoO and BaO with a binder into a bulk form, roughly grinding the bulk form into pieces which are screened and air sorted to yield elements of the proper dimension. Although the pieces would ideally be spheres, the aforementioned technique creates mostly ellipsoids. The elements are annealed at predetermined temperatures to give desired breakdown characteristics to the material. Although air and the aforementioned Sandia developed varistor material have been found to give excellent results in this application, any known arc-sustaining gas such as freon, argon or helium, for example, and any known varistor material formed into non-electroded elements of the size set forth herein are contemplated for use with this invention. The device is operational at very low pressure, as the varistor material releases enough gas under vacuum conditions to support an arc.

Ideally, the only contact the varistor elements of this invention make with adjoining conductors 6 and 11 is through that portion of each randomly oriented element which physically touches a conductor. As each element has a generally rounded outer surface, it is apparent that the electrical path between each cylindrical conductor and touching element 20 is located only at one point on each surface. Similarly, the electrical path between adjoining varistor elements is only at one point on each surface.

Because of the unique arrangement of the varistor elements of the invention, unique results are obtained. At normal operating voltages the impedance between conductors 6 and 11 is many megohms due to the relatively poor electrical path and the characteristics of the varistor material 16. However, when the voltage on conductor 6 increases to a level indicative of an overvoltage, current begins to flow through varistor material 16. As the current increases, the point contacts cannot support the increased current density and begin to develop small arcs. As the current increases further, the arcs continue to increase until the gas breaks down to form a continuous arc between the conductors. At this time overvoltage caused current is conducted from pin 6 to plate 11 through the low impedance arc, completely bypassing the higher impedance varistor circuit. As a result of this operation, the varistor material is spared the high currents which could burn it and render it unusable.

Practically, due to variations in the shape of individual varistor elements, and the random arrangement of elements between the conductors, not all touching elements make an adjoining, i.e., at a point or along a line, contact. Some elements will have an essentially flat surface 21 in contact with an essentially flat surface of other elements. It is apparent from the discussion of the operation of the invention that these few elements function as if there were no junction between the pieces. A few elements may even completely bridge the conductors. However, as long as the preponderence of the varistor elements are essentially adjoining, i.e., most elements making contact only at a point or along a line with neighboring elements or conductors, operation of the device will occur. The high current density present only between adjoining elements and conductors initiates the gas breakdown to form the arcs necessary for operation in accordance with the teachings of the invention.

If the elements were electroded, the current density between conductors and element would be greatly reduced. And if the elements were tightly packed, each element would be crushed against its neighbor so that entire surfaces would be in contact with each other. Under these conditions the desired arcs probably could not form and the device would function in a manner similar to the references.

The only limitations which must be placed on the varistor elements of this invention are that they be large enough to prevent packing that would eliminate the necessary gaps for arcing. Those embodiments which use the plurality of elements of FIG. 2 also limit the maximum cross-sectional dimension of an element to minimize the possibility that a single element could bridge the two conductors with good electrical contact, under which conditions arcing may not occur and the entire current would be carried by the bridging element. However, the embodiment of the invention shown in FIGS. 3A and 3B provides for a different construction.

Figure 3B:
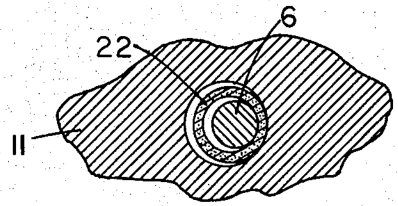
FIGS. 3A and 3B show cutaway side and top views, respectively, of a second preferred embodiment of an overvoltage protection device for use in the connector of FIG. 1.
Figure 3A:
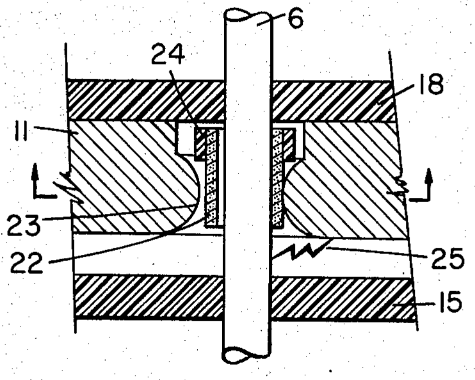

The varistor element of FIGS. 3A and 3B consists of a sleeve 22 having an inner diameter greater than the diameter of conductor 6, a wall thickness equal to minimum distance X, and an outer diameter smaller than the minimum diameter of the hole formed by the inner surface of conductor 11. Each hole in conductor 11 is preferably formed with a convex portion 23 extending towards conductor 6. Varistor sleeve 22, formed from the components used to construct the bulk of material reduced to elements in the previous embodiment, has an insulating sleeve 24 affixed at one end to provide a shoulder which rests against convex portion 23 of conductor 6, thereby holding the varistor material in place while conductor 6 is moved laterally with respect to conductor 11. In addition, at least one of the insulating plates 15 and 18 is preferably spaced from conductor 6.

In the operation of this embodiment, as current from an overvoltage begins to pass through varistor sleeve 22, arcs begin to form in the gaps next to the line contact between the adjoining conductor 6 and sleeve and the point contact between the adjoining sleeve and conductor 11. As the arcs from each conductor increase in size they eventually unite, forming a single arc 25 which typically moves completely away from the varistor sleeve. As in the previous embodiment, the varistor initiated arc now carries the entire overvoltage current, completely protecting the varistor material against burnout.

Figure 4:
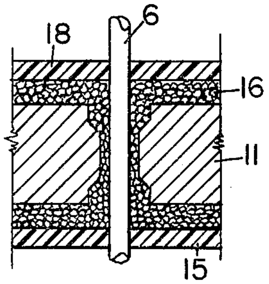
FIGS. 4–7 show more examples of the many embodiments which the overvoltage protection device used in the connector of FIG. 1 may assume.
Figure 5:
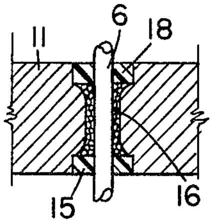

Many other embodiments of the invention are also contemplated, four of which are illustrated in FIGS. 4–7. In each of FIGS. 4 and 5 the contour of conductor 11 has been given a convex shape. In the embodiment of FIG. 4 each of insulators 15 and 18 are spaced from conductor 11 and a layer of varistor particles are inserted in the space. With this embodiment it has been found that insulator 18 may be eliminated as potting material 19 does not flow between the conductors if it is poured directly on the varistor material. In the embodiment of FIG. 5 each of insulators 15 and 18 have been recessed into the gap between the conductors. These embodiments operate in a manner similar to the embodiment of FIG. 2.

Figure 6:
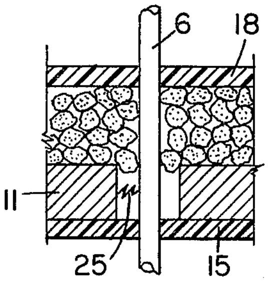
Figure 7:
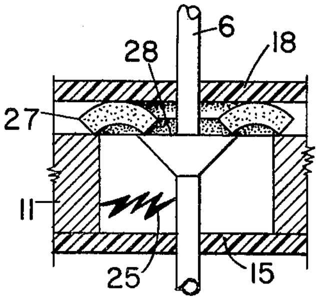

In the embodiment of FIG. 6, insulator 18 is spaced from conductor 11 and each of varistor elements 26 has a minimum dimension of about 1.1X, preventing any varistor element from fitting in the gap between the conductors. In the embodiment of FIG. 7, varistor element 27 is a torus having a concave cross section and an inner diameter greater than the diameter of conductor 6 and an outer diameter a little larger than X. Conductor 6 is provided with a shoulder 28 at the same level as the upper surface of conductor 11. As shown in FIG. 7, the varistor element 27 is held in place by insulator 18 with the inner and outer edges of the torus element making line contacts with cone 28 and conductor 11, respectively. These embodiments operate in a manner similar to the embodiment of FIG. 3A, as the arc which begins at the contacts between the varistor element and the conductors enlarges into an arc 25 between the conductors which clearly does not involve the varistor element.

These embodiments illustrate that the teachings of the invention are met regardless of the shape of the conductors or arrangement of the insulating plates as long as the conductors are electrically connected by an adjoining non-electroded varistor element.

Figure 2:
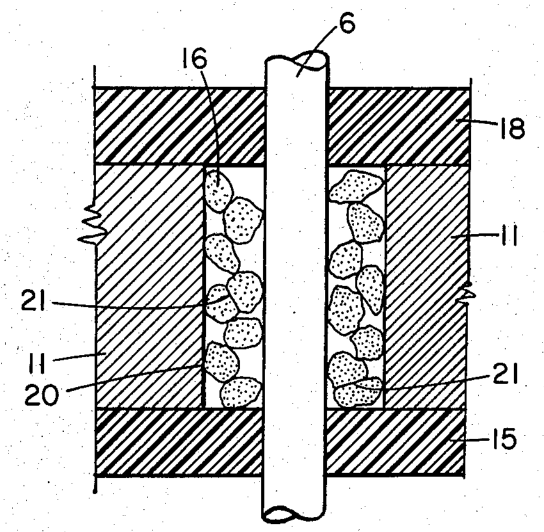
FIG. 2 shows in detail an overvoltage protection device of the type shown in FIG. 1.
Figure 8:
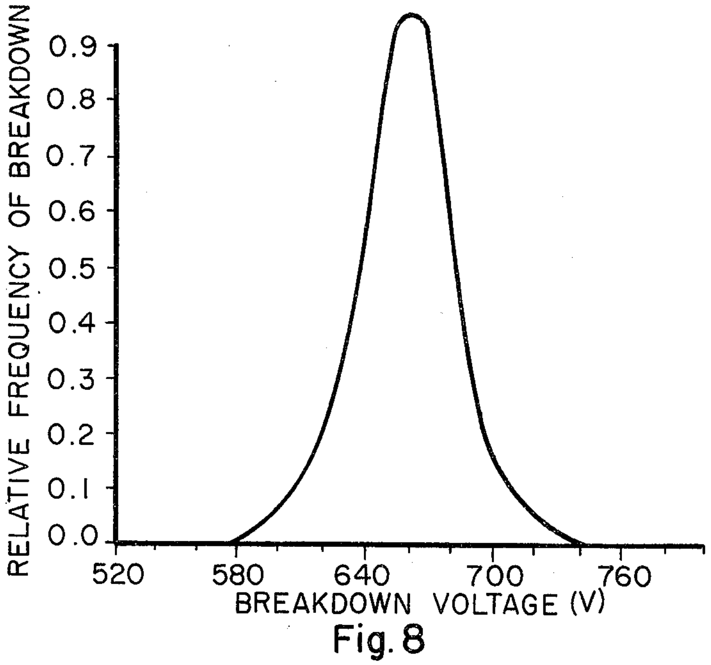
FIG. 8 is a graph illustrating the improved performance of this invention.

FIG. 8 shows the relative occurrence of breakown as a function of breakdown voltage for approximately 1000 conducting pins protected by the embodiment of the invention shown in FIGS. 1 and 2. For these tests the diameter of pin 6 was 70 mils and the distance X was 15 mils. Varistor elements were screened to a minimum cross-sectional dimension of 6 to 8 mils and the varistor material was designed to give a breakdown at 660 volts. In interpreting this curve it is understood that the vertical axis describes the relative probability of occurrence that a pin will break down at the voltage shown on the horizontal axis. Accordingly, this invention is shown to yield an overvoltage protector that can be accurately designed for a particular voltage and, most importantly, produced in quantity with a high expectation that each unit will perform as designed.

For comparison, it is noted that a device utilizing a 15 mil air gap without the varistor material of this invention would not breakdown until the pulsed voltage on conductor 6 was over 2000 volts.

Before the development of this invention tests were made with connectors patterned after but not constructed exactly similar to the connector illustrated in the aforementioned Cooper patent. With a 12 mil air gap that made construction with a tightly fitting dielectric sleeve extremely difficult, the breakdown voltage was designed for 1200 volts and the actual breakdown voltage for a number of samples was found to vary from 1000 to 1500 volts and above. Using that design it would be practically impossible to make a connector that protects a circuit from overloads in the 700 volt range, as the air gaps would be extremely small. It would also be practically impossible to make devices that would breakdown at the designed voltage with the reliability of this invention.

The particular sizes and devices discussed above are cited merely to illustrate particular embodiments of the invention. It is contemplated that the use of this invention may involve different materials, shapes and sizes as long as the principle, using at least one element of non-electroded varistor material making generally adjoining contact with spaced conductors and other elements of varistor material, is followed. A device so constructed will provide reliable overvoltage protection for an electrical circuit. It is intended that the scope of the invention be defined by the claims appended hereto.

I claim:

1. An electrical overvoltage protection device comprising first electrically conductive means for carrying an electric signal subject to overvoltage; second electrically conductive means spaced from said first means a minimum distance X for dissipating the overvoltage; insulator means forming with said first and second conductive means an enclosure; and means within the enclosure for conducting the overvoltage consisting of at least one element of non-electroded varistor material in essentially only point or line contact with and providing a first high impedance current path between said conductive means, said material including no element having a minimum cross-sectional dimension less than 0.2X, and an arc-sustaining gas providing a secondary lower impedance current path between said conductive means when initiated by arcs that form at said point or line contacts.

2. The electrical overvoltage protection device of claim 1 wherein said gas is air at atmospheric pressure.

3. The electrical overvoltage protection device of claim 1 wherein said second conductive means forms the inner surface of a metal annulus; said first conductive means is an elongated metal pin disposed generally parallel to the axis of and extending through said annulus; and said insulating means comprise a pair of spaced generally parallel surfaces of insulating material extending from said annulus to said pin, thereby forming the enclosure.

4. The electrical overvoltage protection device of claim 1 wherein said second conductive means comprises a metal plate having at least one hole extending from an upper surface to a lower surface; said first conductive means comprises at least one elongated metal pin, disposed generally parallel to the axis of and extending through a respective hole; and said insulator means comprises a pair of parallel layers of insulator material, one of said layers covering the upper surface of said plate and the other of said layers covering the lower surface of said plate, each said pin extending through each of said layers.

5. The electrical overvoltage protection device of claim 4 wherein each of said layers contacts a surface of said plate.

6. The electrical overvoltage protection device of claim 1 wherein said varistor material consists of a plurality of elements having a maximum cross-sectional dimension less than about 0.8X, each element making essentially a point or line contact with each adjoining other element or conductive means.

7. The electrical overvoltage protection device of claim 6 wherein each of said elements generally has the form of an ellipsoid having a longest side with a dimension of about 0.5X.

8. The electrical overvoltage protection device of claim 3 wherein said varistor material consists of a tubular sleeve surrounding said pin, said sleeve having an inner diameter greater than the diameter of said pin, a thickness equal to X and an outer diameter less than the diameter of said annulus, whereby said pin is not centered in said annulus.

9. The electrical overvoltage protection device of claim 4 wherein said varistor material consists of a plurality of elements having a minimum cross-sectional dimension greater than 1.1X.

10. The electrical overvoltage protection device of claim 4 wherein at least one said metal pin has a radial metal shoulder extending towards said metal plate at the level of the upper surface, and said varistor material comprises a torus having a concave cross section disposed over said pin with an inner edge contacting said shoulder and an outer edge contacting the upper surface of said plate.

11. The electrical overvoltage protection device of claim 3 wherein each of said surfaces of insulating material has a diameter equal to the diameter of the inner surface of said annulus.

* * * * *